(No Model.)
A. E. CHOQUETTE.
REIN GUARD FOR VEHICLE THILLS.
No. 441,134. Patented Nov. 25, 1890.
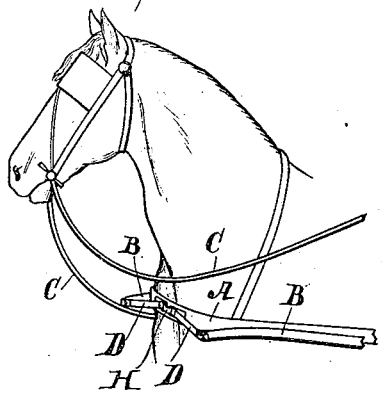
Fig. 1.
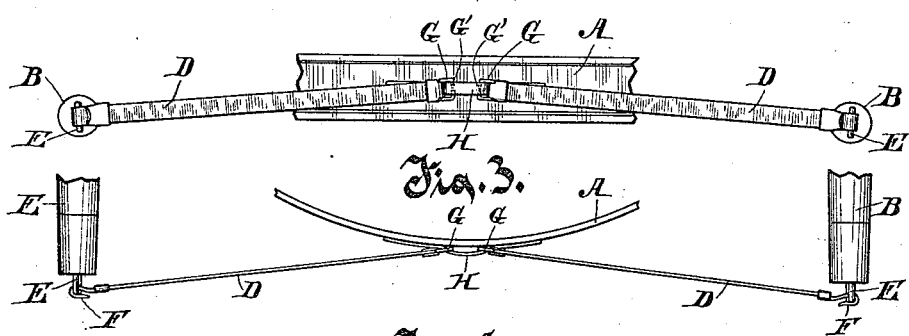
Fig. 2.
Fig. 3.
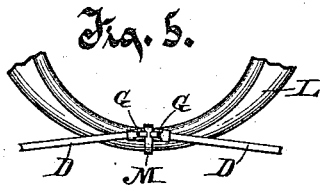
Fig. 5.
Fig. 4.
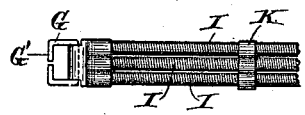
Fig. 6.
Witnesses.
C. N. Kemp,
Charles Knoeruschild
Inventor.
Alfred E. Choquette
by Curtis T. Benedict
Attorney.

UNITED STATES PATENT OFFICE.

ALFRED E. CHOQUETTE, OF MILWAUKEE, WISCONSIN.

REIN-GUARD FOR VEHICLE-THILLS.

SPECIFICATION forming part of Letters Patent No. 441,134, dated November 25, 1890.

Application filed September 1, 1890. Serial No. 363,671. (No model.)

*To all whom it may concern:*

Be it known that I, ALFRED E. CHOQUETTE, of Milwaukee, in the county of Milwaukee and State of Wisconsin, have invented a new and useful Improvement in Rein-Guards for Thills, of which the following is a description, reference being had to the accompanying drawings, which are a part of this specification.

In using a single horse in a vehicle having thills the thills as ordinarily constructed are alongside the horse and project a little in front of the shoulders of the animal, and, as these projecting ends are ordinarily unguarded, the reins running from the bit in the mouth of the horse to the vehicle are apt, when a little slack or when the horse turns his head to right or left, to get caught or entangled with the projecting front ends of the thills.

The object of my invention is to provide a device adapted for use with vehicles having thills, which device is so constructed and attached to the harness and to the thills as to serve effectually as a guard to prevent the reins from being caught by or entangled with the thills.

In the drawings, Figure 1 is a perspective view of the front part of a horse with a portion of the harness and the thills with my improved device attached thereto. Fig. 2 is an enlarged front view of my improved device connected to the harness and the thills. Fig. 3 is a top or plain view of the same device shown in Fig. 2. Fig. 4 is a detail in section showing a preferable form of hook to be inserted in the end of the thill. Fig. 5 is a front view of a portion of a modified form of collar belonging to the harness and a slightly-modified form of my device attached thereto. Fig. 6 is a detail of a portion of a slightly-modified form of device.

In Figs. 1, 2, and 3 the form of the collar A of the harness is such as is known as a "breast-collar," and my improved device is conveniently used in connection therewith, as shown, though the device may be used with any other form of harness in a similar manner. The thills B B are located one on each side of the horse and project a little in front of his breast. With these thills the reins C C are liable to become entangled when the projecting ends of the thills are left unguarded.

My improved device consists of elastic straps D D, secured at their outer ends to the respective front ends of the thills B B and centrally (preferably) secured to the harness conveniently to the collar A.

For the purpose of attaching the straps D D to the thills, I preferably use a right-angled hook E, having a screw-threaded shank which turns into the end of the thill. Any other form of loop or eye would serve for this purpose; but my peculiar form of hook is well adapted for this purpose and is readily made and convenient for use. Another hook F is secured to the strap D and is adapted to take into the hook E. At the inner end each strap D is provided with a right-angled loop G, the outer side of which G' is split or left open centrally in such manner as to be adapted to be readily slipped over and off of the leather loop H, secured permanently to the collar A. These straps are made elastic, so as to provide for the different and unequal movements of the thills on the two sides toward and from the horse as the horse and vehicle move forward. The strap D may be constructed of elastic webbing containing rubber, or it may be formed, as shown in Fig. 6, of one or more strands of coiled wire I I I, provided with a loop G and with means at the other end to secure it to the thills. Such form of strap will also need a band, as K, to hold the several strands in proper relation to each other.

In the modified form of device shown in Fig. 5 the collar L is such as is also in common use, and the elastic straps D D are attached to the front roll thereof conveniently by a transverse leather band M, passing around the collar, in which the loops G G are arranged to be caught and held.

What I claim as new, and desire to secure by Letters Patent, is—

The combination, with a harness having a loop thereon in front of the horse, of two elastic straps, each provided with a split loop G at one end, adapted to engage the loop on the harness, and hooks F F at their outer ends, and thills having hooks E E in their ends arranged to take the hooks F F therein, substantially as described.

In testimony whereof I affix my signature in presence of two witnesses.

ALFRED E. CHOQUETTE.

Witnesses:
C. T. BENEDICT,
C. H. KEENEY.